US007219718B2

(12) United States Patent
Wanni et al.

(10) Patent No.: US 7,219,718 B2
(45) Date of Patent: May 22, 2007

(54) REDUCED VIBRATION TUBE BUNDLE DEVICE

(75) Inventors: Amar S. Wanni, Falls Church, VA (US); Thomas M. Rudy, Warrenton, VA (US); Louis A. Curcio, Houston, TX (US)

(73) Assignee: ExxonMobil Research & Engineering Company, Annandala, NJ (US)

( * ) Notice: Subject to any disclaimer, the term of this patent is extended or adjusted under 35 U.S.C. 154(b) by 0 days.

(21) Appl. No.: 11/474,266

(22) Filed: Jun. 26, 2006

(65) Prior Publication Data

US 2006/0237179 A1    Oct. 26, 2006

Related U.S. Application Data

(63) Continuation of application No. 10/937,531, filed on Sep. 9, 2004, now Pat. No. 7,073,575.

(51) Int. Cl.
*F28D 7/16* (2006.01)
(52) U.S. Cl. ............... 165/162; 165/161; 165/174; 29/890.03
(58) Field of Classification Search ........ 165/159–162, 165/165, 172; 248/68.1; 138/106, 107, 138/112, 115–117; 29/890.03
See application file for complete search history.

(56) References Cited

U.S. PATENT DOCUMENTS 3,420,297 A   1/1969  Romanos
3,964,146 A   6/1976  Vestre et al.
4,342,360 A   8/1982  Gentry
4,429,739 A   2/1984  Gentry
4,648,442 A   3/1987  Williams
4,709,755 A  12/1987  Gentry
4,919,199 A   4/1990  Hahn
5,213,155 A   5/1993  Hahn
5,388,638 A   2/1995  Gentry
5,553,665 A   9/1996  Gentry
5,642,778 A   7/1997  Gentry
6,401,803 B1  6/2002  Hahn

FOREIGN PATENT DOCUMENTS

JP          01028496 A1    1/1989

OTHER PUBLICATIONS

International Search Report PCT/US2005/028920.

*Primary Examiner*—Teresa J. Walberg
(74) *Attorney, Agent, or Firm*—Glenn T Barrett

(57) ABSTRACT

A tube bundle device useful in heat exchangers, condensers and other devices which has a number of tube support cages placed at extended locations along the length of the tubes. After the initial construction of the bundle in which the tubes are inserted into the support cages the tube bundle is stiffened by inserting sets of tube stakes between the tube support cages, preferably at the midpoint of the tube span between the cages. The tubes are supported by rods or bars in each tube lane at the tube support cage locations and the rods in each cage are rotated axially with respect to the rods in the next adjacent cage; in a similar manner, the stakes in each set are rotated axially with respect to the stakes in the next axially adjacent set.

14 Claims, 3 Drawing Sheets

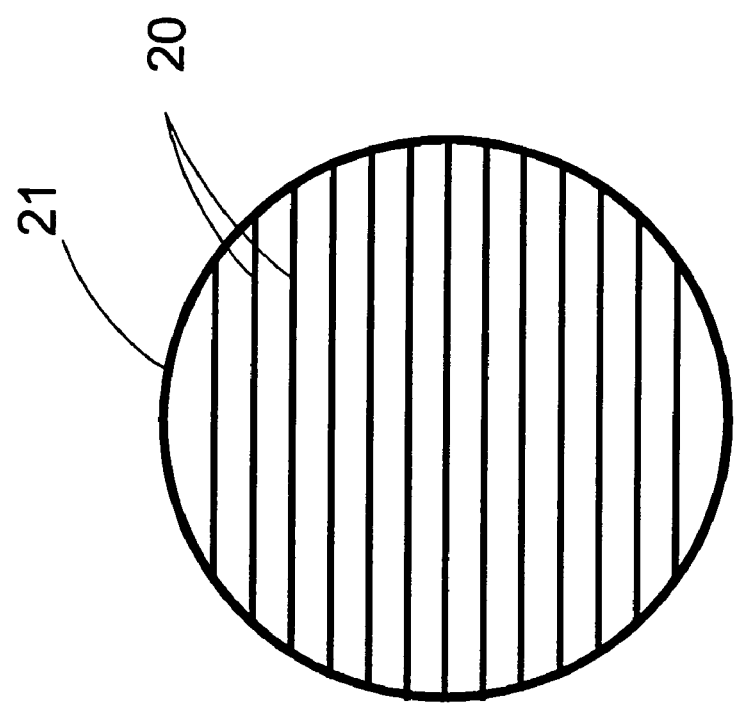
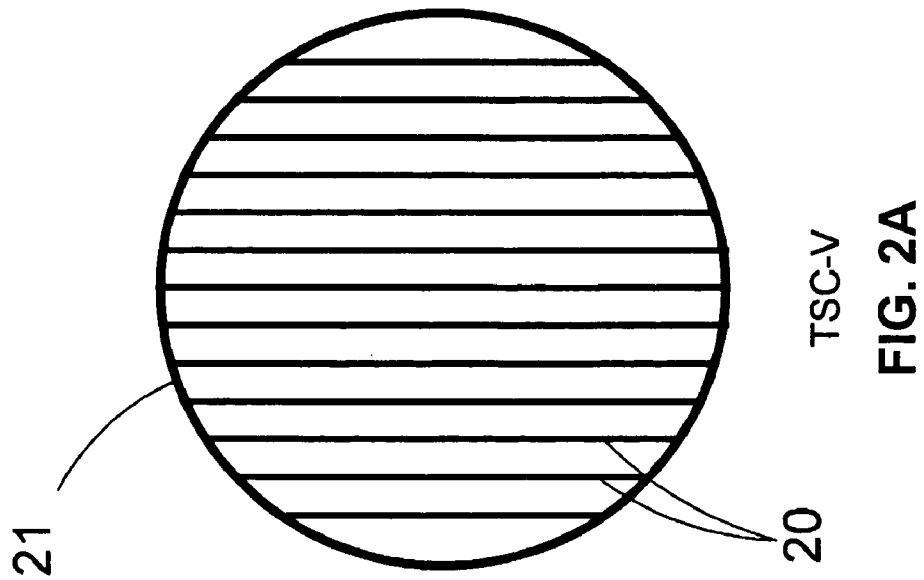
TSC-V
FIG. 2A
TSC-H
FIG. 2B

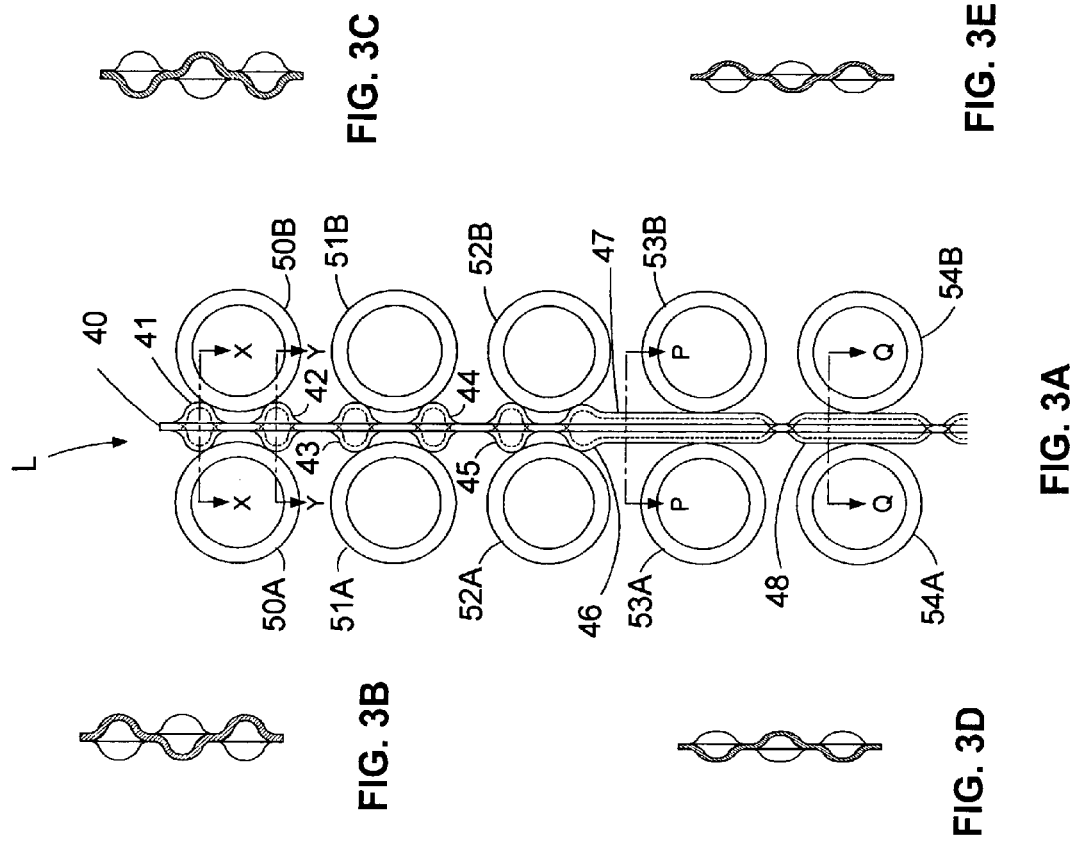

REDUCED VIBRATION TUBE BUNDLE DEVICE

CROSS REFERENCE TO RELATED APPLICATIONS

This application is a continuation application of U.S. patent application Ser. No. 10/937,531, filed Sep. 9, 2004, now U.S. Pat. No. 7,073,575 entitled "Reduced Vibration Tube Bundle Device" to Wanni et al.

FIELD OF THE INVENTION

This invention relates to tube bundle devices such as heat exchangers, condensers and similar fluid-handling equipment with collections of tubes or rod-like elements, for example, in devices such as nuclear reactors, electrical heaters, or any collection of parallel cylindrical shapes that has a fluid flow passing over the tubes or other elements.

BACKGROUND OF THE INVENTION

Tube bundle equipment such as shell and tube heat exchangers and similar items of fluid handling devices such as flow dampers and flow straighteners utilize tubes organized in bundles to conduct the fluids through the equipment. In such tube bundles, there is typically fluid flow both through the inside of the tubes and across the outside of the tubes. The configuration of the tubes in the bundle is set by the tubesheets into which the tubes are set. One common configuration for the tubes is the rectangular or square formation with the tubes set in aligned rows with tube lanes (the straight paths between the tubes) between each pair or rows, aligned orthogonally to one another. In this formation, each tube is adjacent to eight other tubes except at the periphery of the tube bundle and is directly opposite a corresponding tube across the tube lane separating its row from the two adjacent rows. In the triangular tube formation, the tubes in alternate rows are aligned with one another so that each tube is adjacent to six other tubes (the two adjacent tubes in the same row and four tubes in the two adjacent rows).

Increases in throughput in existing exchangers are often desired either to reduce capital cost by reducing equipment size or to increase productivity factors. A common limiting factor experienced when evaluating the increase of rates in an exchanger is the potential for flow-induced vibration damage of the tubes. Fluid flow patterns around the tubes may give rise to flow-induced vibrations of an organized or random oscillatory nature in the tube bundle and in the case of devices such as heat exchangers in which heat transfer takes place between the tubes and the surrounding fluid, the changes in the temperature and density of the fluid as it circulates and flows around the tubes may increase the likelihood of vibration. If these vibrations reach certain critical amplitudes, damage to the bundle may result. Tube vibration problems may be exacerbated if heat exchange equipment is retubed with tubes of a different material to the original tubes, for example, if relatively stiff materials are replaced with lighter weight tubes. Flow-induced vibration may also occur when equipment is put to more severe operating demands, for example, when other existing equipment is upgraded and a previously satisfactory heat exchanger, under new conditions, becomes subject to flow-induced vibrations. Vibration may even be encountered under certain conditions when a heat exchanger is still in the flow stream but without heat transfer taking place as well as in other tube bundle devices with collections of rods or rod-like elements in a flow stream with or without heat transfer.

A number of different equipment designs have evolved to deal with the problem of tube vibration. One example is the rod baffle design. Rod baffle heat exchangers are shell and tube type heat exchangers utilizing rod baffles to support the tubes and secure them against vibrations. Additionally, rod baffles can be used to reduce shell-side flow maldistributions and to create a more uniform shell-side flow. The term "baffle" refers to the annular rings, placed every 15 cm or so along the length of the tube bundle, in which the ends of a plurality of support rods are connected to form a cage-like tube support structure; hence the term "rod baffle". Rod baffle exchangers, however, tend to be approximately 30 to 40% more expensive than conventional shell-and-tube exchangers and there have been situations where tube bundle devices of this kind have failed owing to flow-induced vibrations. Rod baffle heat exchanges are described, for example, in U.S. Pat. Nos. 4,342,360; 5,388,638; 5,553,665; 5,642,778.

As explained in U.S. Pat. No. 5,553,665, certain applications of the rod baffle design such as surface condensers and power plant applications may benefit from longitudinal-flow, with shell-side pressure losses to be minimized. Reduction in shell-side pressure losses may be accomplished by increasing rod baffle spacing, thereby reducing the number of rod baffles, or by decreasing the number of tubes by increasing the tube pitch dimension, i.e., the distance between two adjacent rows of tubes as measured from the center of the tubes. Increasing baffle spacing is usually not an attractive option, since increased baffle spacing increases the likelihood of flow-induced tube vibration occurrence. Decreasing the tube count by increasing tube pitch dimension produces decreased shell-side pressure loss for longitudinal-flow between rod baffles, but requires oversized support rod diameters, leading to increased rod baffle pressure losses, which may offset any decrease in longitudinal-flow, shell-side pressure loss resulting from the reduced tube count. This would also lead to a more expensive exchanger owing to the increased shell diameter for a specified tube count. The rod baffle design described in U.S. Pat. No. 5,553,665 represents an attempt to deal with the pressure drop problems of the rod baffle configuration.

An alternative design is the "Eggcrate" design. This, however, is even more expensive than the rod baffle design while it also allows tube chatter that could lead to tube failure. Chatter is the motion of a tube hitting the tube supports because of the gap between the support and the tube outside diameter. The gap is required to allow for inserting the tubes through the eggcrate support when the bundle is being constructed. From the economic and operational viewpoints, therefore, the road baffle design represents a more hopeful starting point.

Besides good equipment design, other measures may also be taken to reduce tube vibration. Tube support devices or tube stakes as these support devices are commonly known (and referred to in this specification) may be installed in the tube bundle in order to control flow-induced vibration and to prevent excessive movement of the tubes. A number of tube supports or tube stakes have been proposed and are commercially available. U.S. Pat. No. 4,648,442 (Williams), U.S. Pat. No. 4,919,199 (Hahn), U.S. Pat. No. 5,213,155 (Hahn) and U.S. Pat. No. 6,401,803 (Hahn), for example, describe different types of tube stake or tube support which can be inserted into the tube bundle to reduce vibration.

Improved tube stakes are shown in U.S. patent application Ser. No. 10/848,903, filed 24 Jun. 2003, entitled "Anti-Vibration Tube Support" of A. S. Wanni, M. M. Calanog, T. M. Rudy, and R. C. Tomotaki.

We have now devised a tube bundle device, for example, a heat exchanger which is believed to be more effective, more reliable, more easy to fabricate and less expensive than a conventional heat exchanger of the rod baffle type. According to the present invention, a tube support cage (TSC) similar to a rod baffle is placed at extended locations along the length of the tubes, e.g. every 60–100 cm apart, thereby making fabrication of such a tube bundle much easier and less expensive, as compared to conventional rod-baffle devices, in which the rod-baffle supports are typically placed no more than approximately 15 cm apart. The tube bundle is stiffened by inserting tube stakes between the tube support cages, preferably at the midpoint of the tube span between the cages. The preferred type of tube stake is the type described in copending U.S. patent application Ser. No 10/848,903, referred to above but other stakes might also be used.

According to the present invention, the tubes are supported by rods or flat bars in each tube lane at the TSC locations, compared to the cages provided in every other tube lane in the rod baffle design. The rod baffle design requires four distinct types of baffles with support rods in alternate tube lanes at alternate axial locations, both horizontally and vertically, but the current invention is simpler requiring only two types: one with horizontal rods (or flat bars) and the other with vertical rods (or flat bars). As another advantage, the current invention prevents or reduces the tube chatter resulting from insufficient tube support as well as the possibility of flow-induced vibrations exacerbated by the chatter. Chatter is often considered to be essentially unavoidable in rod baffle type exchangers unless the rod diameter is very closely equal to the spacing between the adjacent tubes. However, the smaller the gap between the rods and the adjacent tubes, the more difficult and costly is the assembly of the bundle.

In general terms, the tube bundle device according to the present invention uses tube support cages which alternate with the sets of tube support stakes axially along the tubes. The orientation of the tube support members of each cage is rotated axially with respect to the tube support members of each axially adjacent cage and the orientation of the tube support stakes of each set is rotated about the axis with respect to the tube support stakes of each axially adjacent set. A number of different types of tube support stake may be used, preferably of the type which will deviate the tubes slightly to engage with the support members of the cages, comprising longitudinally extensive strips with successive transverse rows of raised, tube-engaging zones on each face of the strip which extend laterally outwards from both faces of the strip to engage with the tubes on the opposite sides of the tube lane into which the stake is inserted.

The invention is primarily applicable to the rectangular tube arrangement but could be applied also to the triangular configuration with the axial rotation of the successive cages and sets of stakes being in accordance with the type of arrangement. In rectangular arrangements, the support members in the cages will be rotated 90° from horizontal to vertical to horizontal successively and similarly for the alignment of the successive sets of stakes. In the triangular tube arrangement the rotation will be 60° or 120° at successive locations. The use of the triangular arrangement allows fabrication of less expensive exchangers by decreasing the shell diameter for a specified number of tubes although one drawback is that the support structure is not as strong as for the inline arrangement.

In this specification and claims, the terms "vertical" and "horizontal" are used in the relative sense with respect to the orientations of the elements of the tube support cages and of the stakes, that is, to designate a relative orientation of the support cage elements or of the stakes with respect to one another and the axis of the device. Thus, references to the "vertical" orientation mean that the orientation is orthogonal to a specified "horizontal" orientation, without implying that the orientations are true vertical or true horizontal. This applies especially when the axis of the heat exchanger itself is vertical or horizontal, so that all the support cages and stakes will be at true horizontal. Thus, the references to "vertical" and "horizontal" in relation to the orientation of the elements of the tube support cages and of the stakes are to be taken on the assumption that the longitudinal axis of the tube bundle device is itself true horizontal and that the specified orientations are relative to one another not true. For example, in a heat exchanger with a true horizontal longitudinal axis, the elements of the tube support cages may be at angles of 45° to the true horizontal/vertical but still be "vertical" and "horizontal" with respect to each other. In a heat exchanger with a vertical longitudinal axis, all the elements of all the tube support cages will be at true horizontal but are nevertheless to be considered to be "vertical" and "horizontal" if their orientations relative to one another about the longitudinal axis are orthogonal.

Normally, the cages will alternate along the length of the tubes with the sets of tube stakes: Stake Set 1, Cage 1, Stake Set 2, Cage 2, Stake Set 3, Cage 3, Stake Set 4 and so on. The orientations of the cages will be rotated about the longitudinal axis at successive axial locations so that Cage 2 is rotated with respect to Cage1 and Cage 3 with respect to Cage 2; in the rectangular arrangement with two successive 90° rotations, Cage 3 will revert to the same alignment as Cage 1. In the triangular tube arrangement, a rotation of a multiple of 60° (i.e. 60° or 120° with further successive rotations restoring previous alignments) is made at each axial location. Similarly, the orientations of the stake sets will preferably be rotated about the longitudinal axis at successive axial locations with the stakes inserted parallel to the support rods of an adjacent support cage next along the axis of the bundle. So, in a rectangular tube arrangement, Stake Set 2 is rotated 90° with respect to Stake Set 1 and Stake Set 3 with respect to Stake Set 2 and with two successive 90° rotations, Stake Set 3 will revert to the same alignment as Stake Set 1. In the triangular tube arrangement, three successive 60° rotations will restore the original alignment.

In the fabrication of the tube bundle, the tubes are inserted through each tube support cage and into one or both tubesheets to form the bundle with defined tube lanes between adjacent rows of tubes. At this point, there is, desirably, some clearance between the tubes and the support members as the support members of each cage are spaced apart from one another to allow the clearance or play between the tubes and the support members. Because the tubes fit into the tube support cages with some clearance, it is possible to insert the tubes more readily than with the conventional tight fitting rod and baffle design. The tube stakes are then inserted into the defined tube lanes at each location along the tubes from the cage(s). The stakes are inserted so that they are aligned parallel to the tube support members of an axially adjacent support cage to impart an increased separation between the tubes so that they are urged against the support members of the adjacent cage to take up the clearance and hold the each tube against one or another support member. In this way, fabrication of the tube bundle is facilitated while a final, rigid, vibration-resistant tube bundle is achieved.

BRIEF DESCRIPTION OF THE DRAWINGS

The invention will now be described in conjunction with the accompanying drawings in which:

FIG. 2A is a simplified schematic of a vertical tube support cages which may be used according to the invention;

FIG. 2B is a simplified schematic of a horizontal tube support cages which may be used according to the invention;

FIG. 3A is a side view of a secure tube stake which may be used in according to the invention;

FIG. 3B is a cross section view of the tube stake of FIG. 3A taken along X—X;

FIG. 3C is a cross section view of the tube stake of FIG. 3A taken along Y—Y;

FIG. 3D is a cross section view of the tube stake of FIG. 3A taken along P—P; and FIG. 3E is a cross section view of the tube stake of FIG. 3A taken along Q—Q.

DETAILED DESCRIPTION

Figure 1:
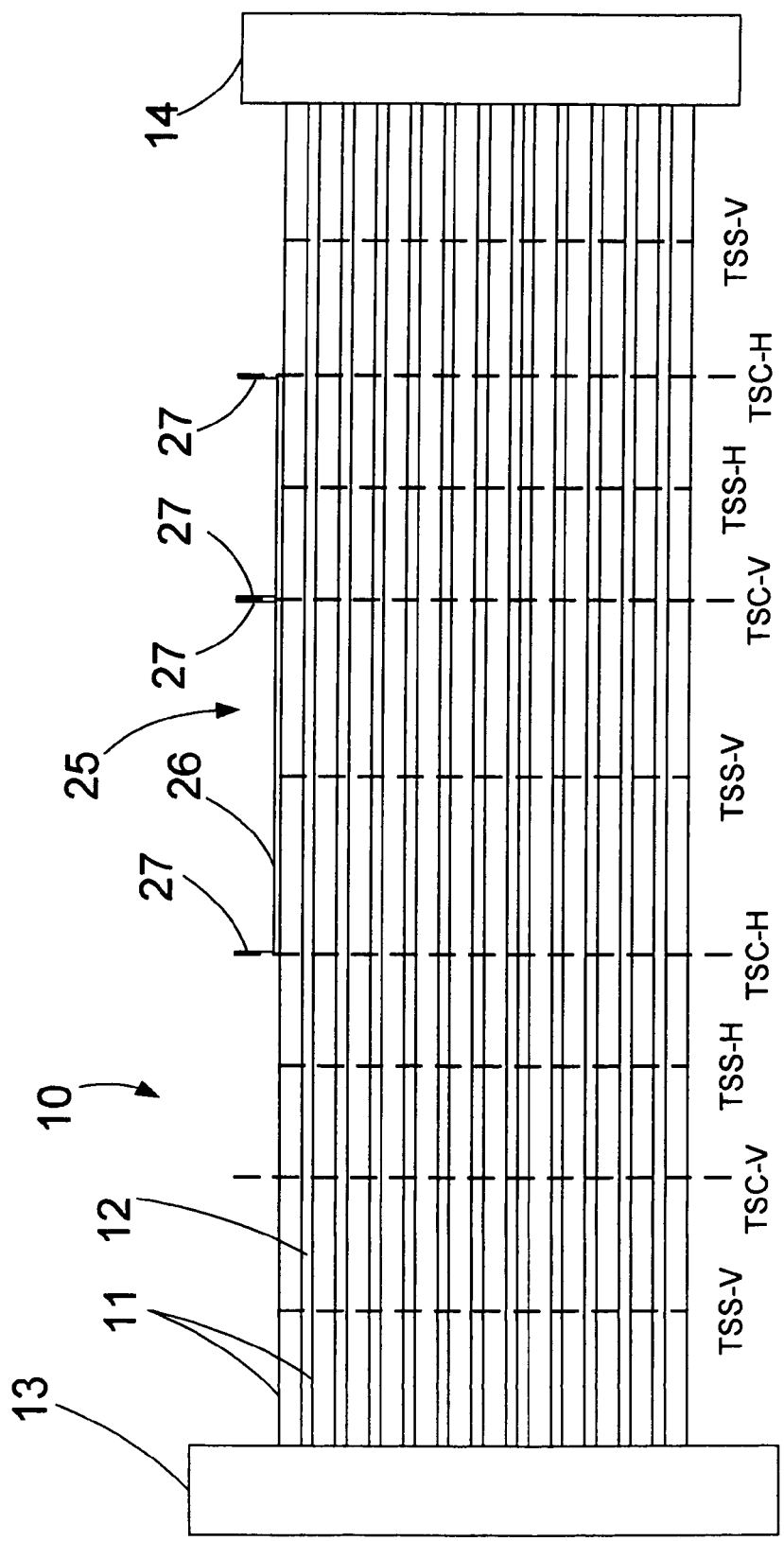
FIG. 1 is a simplified schematic of a tube bundle with the tubes supported by tube support cages and tube stakes according to the invention.

FIG. 1 shows a schematic of a tube bundle which could be used in a heat exchanger, condenser, nuclear fuel rod device or any other type of ordered arrangement of parallel tubes with fluid flowing over them. For convenience and brevity the invention will be described with reference to the device as a heat exchanger although other tube bundle devices may also be constructed according the present principles. The tube bundle will be fitted into the surrounding shell in a conventional manner, for example, with two fixed tubesheets if the exchanger is to operate with only a small temperature differential or, more commonly, with one fixed tubesheet and one floating tubesheet, or with a U-tube bundle having only one fixed tubesheet.

The tube bundle 10 comprises a number of parallel tubes 11 (two indicated) in the rectangular configuration, that is, with orthogonal rows of tubes extending in two directions with tube lanes 12 (one indicated) between the tube rows. The tubes are fixed into the tubesheets 13, 14 at each end of the tube bundle in conventional manner and the tubesheets, in turn, will be installed into the shell of the exchanger.

The tubes are supported by tube support cages at intervals along the length of the tubes, as shown in FIG. 1. The tube support cages are of two types, namely, tube support cage vertical (TSC-V), as shown in FIG. 2A, and tube support cage horizontal (TSC-H), as shown in FIG. 2B. The vertical and horizontal tube support cages alternate along the lengths of the tubes so that the tubes are supported in turn vertically and then horizontally. The tube support cages are similar in construction to a conventional rod baffle, with tube support rods or flat bars 20 traversing the annular ring chordally with their ends received in the annular ring 21. Normally, the tube support rods will have a circular or rectangular (preferably square) cross-section; rods of rectangular cross-section may be referred to as bars but for convenience and brevity, the members traversing the annular ring will be referred to as "rods" regardless of their cross-sectional shape. The rods may be directly welded to the sides of the rings (across its wall thickness) or, with a more complicated construction, received in recesses or apertures in the annular ring, shaped appropriately to the cross-section of the rods, e.g. circular recesses or apertures for circular rods formed by drilling with the rods secured in the recesses or apertures by welding, brazing or other securing expedients. The tube support cages will normally be located approximately every 50–200 cm along the length of the tubes, in most cases, about every 60–150 cm. This distance between support cages/stakes may be decreased at the two ends and increased in the middle portion of the exchanger because the axial velocity in the middle portion of the bundle is parallel to the tubes and therefore is less likely to cause vibration.

The rods extending across the tube support cages are placed in every tube lane but in each cage all the rods are arranged only in one direction, either horizontally or vertically, to form a TSC-H or TSC-V, respectively, as shown in FIG. 1. The two types of tube support cage alternate axially along the length of the tubes: TSC-V, TSC-H, TSC-V, TSC-H etc.

The thickness of the rods in the TSC's may be slightly smaller (measured in the plane of the cage) than the inter-tube spacing so that the tubes can be readily inserted into the prefabricated cages. This makes bundle loading a fairly easy task. On large diameter bundles, small rods may be deflected by flow and for this reason, it may be desirable to use support rods in the form of flat bars for a greater modulus, resulting in greater axial strength. The absence of complete support from the rods does not, however, diminish the effectiveness of the overall support system because additional support is provided by the tube stakes which are inserted into the tube bundle. In the rectangular tube arrangement, the alternating vertical/horizontal disposition of the support rods will result in the stakes in each set being parallel to the support rods of one of the adjacent cages so that the tubes are held by the stakes firmly against the support rods to which they are parallel. Similarly, in the triangular tube arrangement, it is preferable for the orientation of the stakes at a given location to be parallel to the support rods of one of the adjacent cages in order to hold the tubes firmly against the rods of that cage.

The tube stakes which may be used may be of any type commonly used for that purpose, provided that they are dimensioned to impart the increased tube separation on insertion into the tube bundle to hold the tubes firmly against the support rods of the cages. Thus, for example, the tube stakes described in U.S. Pat. No. 4,648,442 (Williams), U.S. Pat. No. 4,919,199 (Hahn), U.S. Pat. No. 5,213,155 (Hahn) and U.S. Pat. No. 6,401,803 (Hahn) might be used provided that their dimensions are satisfactory to the purpose. The preferred type of tube stake is, however, the type shown in U.S. patent application Ser. No. 10/848,903, to which reference is made for a description of these preferred tube stakes. Another preferred form of tube stake which may be used in the same manner is described in U.S. application Ser. No. 11/128,884 to Wanni et al.

The tube stakes are inserted to stiffen the tube bundle with the stakes inserted into the bundle around the midpoint of the tube span between two tube support cages. Because the tubes receive support from the cages, it is not necessary to insert the stakes into each tube lane. Although insertion of the tube support stakes into the same tube lanes at successive locations will make the bundle stronger, it is possible to insert the stakes only into alternate tube lanes with the insertion lane alternating at each successive location. For example, the stakes may be inserted into the odd-numbered tube lanes at the first location, into the even-numbered lanes at the second location and so on along the length of the tube bundle at successive stake set locations. This alternating stake insertion although providing a tube bundle which is less rigid is capable of providing a benefit in terms of permitting freer fluid flow through the bundle. The direction of insertion (alignment) for the stakes is made to alternate in the same way as the cages, namely, the stakes are inserted in a different direction at each station or location where they are inserted into the bundle: at one location they are inserted vertically (TSS-V) and at the next tube stake location, horizontally (TSS-H), so that the tube stake stations can be described as TSS-V, TSS-H, TSS-V, TSS-H, and so on, as shown in FIG. 1. The parallel alignment of the stakes with the support rods of an adjacent cage urges the tubes against a support member of the cage to give the final bundle the rigidity it requires for satisfactory operation. The insertion of the tube stakes into the tube bundle forces the tubes away from the surface of the stakes and in this way, the tubes are slightly (up to 2 mm) deflected so as to provide tube support not only at the tube stake locations but also at the tube support cage stations as well.

As shown in FIG. 1, bypass shrouds 25 are preferably provided at the top and bottom of tube bundle 10 to preclude longitudinal bypassing of the shellside fluid. These shrouds may suitably be fabricated from sheet metals, preferably, stainless steel material. The bypass shrouds are formed with a flat face 26 which sits against the outermost tubes and a peripheral flange 27 at each end. The flange is an chordal segment of a circle of diameter matching the internal diameter of the exchanger shell so that when the tube bundle is inserted into the shell, the flange conforms closely to the interior of the shell to preclude entry of shell side fluid into the shrouded region. The shrouds may be made in standard lengths and a number of them may be bolted (or otherwise fastened together end-to-end) through the flanges so as to extend over the tubes in all areas except at the inlet and outlet ends where flow to the shell inlet and outlet is required. The shrouds are to be fastened to the tube support cages for adequate rigidity, for example, by having the flanges 27 bolted together with a tube support cage in between them.

In the triangular tube arrangement, a similar disposition of the tube support cages and stake sets can be made but in this case, the alignment of the support rods in the cages at each successive axial location is rotated by a multiple of 60° so that the original alignment is restored at the fourth location (i.e. the support rods are successively aligned at 0°, 60°, 120° and so on), with the stakes inserted in a similar alignment pattern. Given the desirability of having the stakes inserted parallel to the support rods of an adjacent support cage, a typical mode of insertion would be as follows, with the relative angular positions of the cage support rods and stakes indicated at angular displacements of 0°, 60°, 120° relative to the first cage:

TSC-0°, TSS-0°, TSC-60°, TSS-60°, TSC-120°, TSS-120°, TSC-0°, TSS-0°.

Assembly of the tube bundle is normally made by inserting the tubes into the cages, a task facilitated by the relatively easy fit of the tubes between the support rods with some play being allowable between the tubes and the support rods. The clearance, between the tubes and the cage support rods, typically up to about 1 mm is then taken up by insertion of the stakes to tighten up the bundle and produce a final, well-supported tube bundle of very rigid construction. This construction technique is notably easier than with conventional rod baffle designs since the stiffness is incorporated by the insertion of the stakes after the tubes are inserted into the cages.

During assembly, the tubes are inserted through the cages and into one or both tubesheets. In the case of a tube bundle with U-shaped tubes received in one tubesheet, the cages will be put onto the free ends of the tubes and the tubes then secured in the single tubesheet. In the case of a bundle with two tubesheets, the tubes will normally be passed through the cages and into one or both tubesheets, following which, the tubes will be secured to one or both of the tubesheets, according to exchanger design, e.g. by welding or with an expanded joint.

FIGS. 3A–3E show the preferred form of tube stake described in U.S. patent application Ser. No. 10/848,903. This type of tube stake includes corrugations along the inner portion (within the tube bundle) which deflect the tubes slightly to provide resilient support for the tubes while, at the same time, enabling the stakes to be readily inserted into the bundle; at its outer extremity, each stake has dimples which deflect the tubes slightly in the same way as the corrugations but which lock more securely onto the outermost tubes so as to minimize the likelihood of undesirable dislocation of the stakes strips during handling or in operation.

The tube stake 40 is formed from a strip of metal which extends in tube lane L defined by the tubes on the two sides of the lane. In the complete tube bundle, there will be additional tubes extending in the row formed by a continuation of the tube rows, with other tube rows arranged in similar conventional manner making up the tube bundle. The tube lanes between these two adjacent rows and other adjacent rows of tubes will be similarly extensive across the tube bundle. Tube stake 40 has six transverse rows 41, 42, 43, 44, 45, 46 of raised tube-engaging zones in the form of raised, generally circular dimples extending across the strip, shown in FIGS. 3A, 3B and 3C with row 46 merging into the first row of corrugations 47 so that the merged dimples/corrugations form a keyhole-shaped tube-engaging zone which has a quasi-circular dimple towards the outer end of the stake and a linear corrugation towards at the inner end, shown in FIGS. 3A, 3D and 3E. This form of stake is shown in FIGS. 6 and 7 of U.S. application Ser. No. 10/848,903, to which reference is made for a detailed description of this form of stake.

The transverse rows of dimples are arranged at successive longitudinal locations along the length (longitudinal axis) of the strip: each pair of successive rows is positioned to provide support for a pair of tubes which are adjacent one another on one side of tube lane L, with each row (except the outermost row) providing support for a pair of tubes which are adjacent one another but on opposite side of the tube lane. Thus, rows 41 and 42 provide support for tube 50A and on one side of tube lane L and tube 50B on the other side of the lane. Similarly, rows 43 and 44 provide support for tubes 51A and 51B on opposite sides of the tube lane by means of the dimples extending out on each side of the strip. Dimples in rows 45 and 46 provide support for tube 52A and 52B with dimples in row 46 merging into the first transverse row of corrugations 47 which provides resilient support for tubes 53A and 53B. The next row of corrugations 48 provides support for tubes 54A and 54B.

The dimples in rows 41 and 42 are formed as shown in the sections X—X and Y—Y and the corrugations as shown in sections P—P and Q—Q. The lengths of the corrugations (longitudinally) can be set so that each row of corrugations either engages (as shown in FIG. 3) with a pair of adjacent tubes on opposite sides of a tube lane or in a nesting arrangement with a pair of adjacent tubes on the opposite sides of the lane in the depression formed between the ends of two rows of corrugations.

The arrangement shown in FIGS. 3A–E with three raised tube-engaging zones in each transverse row is convenient and typical for a tube stake with a width of approximately 4–6 cm, convenient for many applications. However, the width of the stake could be larger, for example, up to about 20 cm and in this case a larger number of raised tube-engaging areas could be provided in each transverse row, for example, 5 raised dimples arranged 3 and 2 on alternate sides of the strip, as described in application Ser. No. 10/848,903.

The placings of the transverse rows of raised, tube-engaging zones on the tube stake are to provide the desired engagement between the tube stake and the tubes in the tube bundle with which they are being used. To accommodate pass lanes in the tube bundles, the distances between successive transverse rows of raised, tube-engaging zones (dimples, corrugations) may be increased correspondingly, consistent with the arrangement of tubes in the bundle.

Each tube stake engages with tubes on opposite sides of a tube lane in which it is inserted so that insertion of a stake in the alternate tube lane provides support for two rows of tubes within the outer periphery of the tube bundle. At the periphery of the bundle some tubes may receive support from a stake which does not support a tube on the other side as a result of the changing length of the tube lanes across the bundle. This reduces the effective support given to those tubes but since the length of stake extending out from the last pair of tubes within the bundle is relatively short, some effective support is given to these outer tubes on one side at least by the cantilevered end of the stake.

What is claimed is:

1. A tube bundle device comprising:
   a plurality of tubes arranged parallel to one another in tube rows, wherein tube lanes separate the tube rows;
   at least one first tube support cage having a plurality of spaced apart elongated tube support members and a support ring, wherein each of the plurality of tube support members is secured to the support ring, wherein the plurality of spaced apart elongated tube support members are located within the tube rows;
   at least one second tube support cage having a plurality of spaced apart elongated tube support members and a support ring, wherein the plurality of spaced apart elongated tube support members are located within the tube rows, wherein the plurality of spaced apart elongated tube support members of the at least one second tube support cage are disposed at an angle with respect to the plurality of spaced apart elongated tube support members of the at least one first tube support cage, wherein the at least one second tube support cage being spaced from the at least one first tube support cage; and
   at least one bypass shroud extending around a portion of the plurality of tubes along a length thereof.

2. The tube bundle device according to claim 1, wherein the at least one bypass shroud is secured to at least one of the first tube support cage and the second tube support cage.

3. The tube bundle device according to claim 2, wherein each of the at least one bypass shroud having a first flange located on one end and a second flange located on another end, wherein the first flange is secured to the first tube support cage and the second flange is secured to the second tube support cage.

4. The tube bundle device according to claim 1, wherein each of the at least one bypass shroud having a surface that abuts at least a portion of the outermost tubes in the plurality of tubes.

5. The tube bundle device according to claim 1, further comprising:
   a plurality of tube support stakes inserted within at least one of the tube rows to engage adjacent tubes, wherein the plurality of tube support stakes being located between the at least one first tube support cage and the at least one second tube support cage.

6. The tube bundle device according to claim 5, wherein each of the plurality of tube support stakes comprising:
   an elongated strip having a pair of opposing faces, wherein the strip having a length; and
   a plurality of engaging members extending from the pair of opposing faces,
   wherein the elongated strip is sized such that the elongated strip is located within a tube row,
   wherein a portion of the plurality of engaging members extend from one face of the opposing faces and are arranged to contact the tubes positioned adjacent the one face and another portion of the plurality of engaging members extend from another face of the opposing faces and are arranged to contact the tubes positioned adjacent the other face.

7. The tube bundle device according to claim 5, wherein the plurality of tube support stakes are inserted within alternating tube rows.

8. A heat exchanger, comprising:
   a tube bundle having a plurality of tubes arranged parallel to one another in tube rows, wherein tube lanes separate the tube rows, wherein each tube having a pair of ends;
   at least one tubesheet, wherein at least one of the pair of ends being secured to the at least one tubesheet;
   at least one first tube support cage having a plurality of spaced apart elongated tube support members and a support ring, wherein each of the plurality of tube support members is secured to the support ring, wherein the plurality of spaced apart elongated tube support members are located within the tube rows;
   at least one second tube support cage having a plurality of spaced apart elongated tube support members and a support ring, wherein the plurality of spaced apart elongated tube support members are located within the tube rows, wherein the plurality of spaced apart elongated tube support members of the at least one second tube support cage are disposed at an angle with respect to the plurality of spaced apart elongated tube support members of the at least one first tube support cage, wherein the at least one second tube support cage being spaced from the at least one first tube support cage; and
   at least one bypass shroud extending around a portion of the plurality of tubes along a length thereof.

9. The heat exchanger according to claim 8, further comprising:
   a plurality of tube support stakes inserted within at least one of the tube rows to engage adjacent tubes, wherein the plurality of tube support stakes being located between the at least one first tube support cage and the at least one second tube support cage.

10. The heat exchanger device according to claim 9, wherein the plurality of tube support stakes are inserted within alternating tube rows.

11. The heat exchanger according to claim 9, wherein each of the plurality of tube support stakes comprising:
- an elongated strip having a pair of opposing faces, wherein the strip having a length; and
- a plurality of engaging members extending from the pair of opposing faces,
- wherein the elongated strip is sized such that the elongated strip is located within a tube row,
- wherein a portion of the plurality of engaging members extend from one face of the opposing faces and are arranged to contact the tubes positioned adjacent the one face and another portion of the plurality of engaging members extend from another face of the opposing faces and are arranged to contact the tubes positioned adjacent the other face.

12. The heat exchanger according to claim 8, wherein each of the at least one bypass shroud having a surface that abuts at least an outer of the tube bundle.

13. The heat exchanger according to claim 8, wherein each of the at least one bypass shroud is secured to at least one of the first tube support cage and the second tube support cage.

14. The heat exchanger according to claim 13, wherein each of the at least one bypass shroud having a first flange located on one end and a second flange located on another end,
- wherein the first flange is secured to the first tube support cage and the second flange is secured to the second tube support cage.

* * * * *